John M. Lee
INVENTOR.

Oct. 20, 1953    J. M. LEE    2,655,853
TRACTOR-MOUNTED CULTIVATOR
Filed Aug. 8, 1949    4 Sheets-Sheet 2

John M. Lee
INVENTOR.

Oct. 20, 1953  J. M. LEE  2,655,853
TRACTOR-MOUNTED CULTIVATOR
Filed Aug. 8, 1949  4 Sheets—Sheet 3

John M. Lee
INVENTOR.

Oct. 20, 1953         J. M. LEE              2,655,853
                 TRACTOR-MOUNTED CULTIVATOR
Filed Aug. 8, 1949                         4 Sheets-Sheet 4
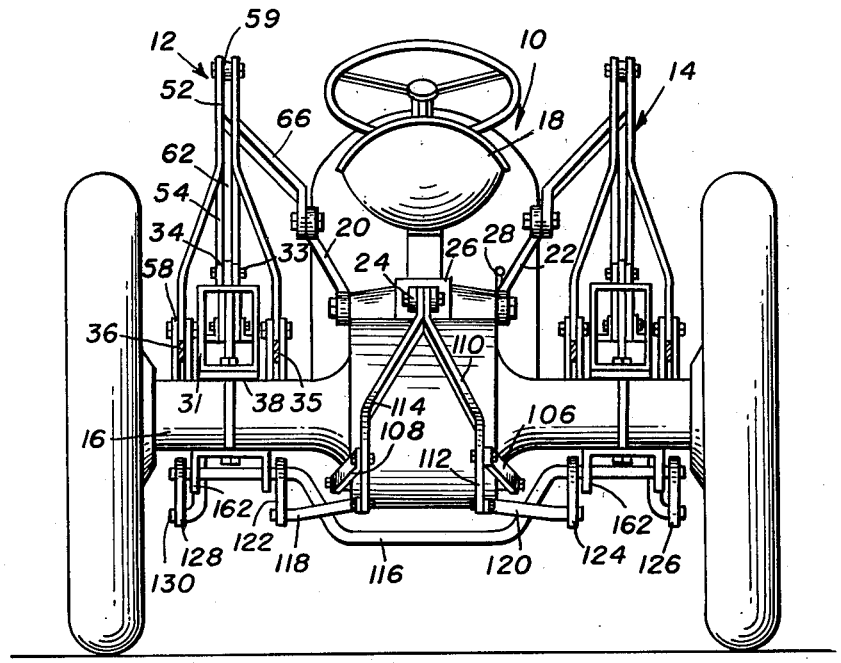
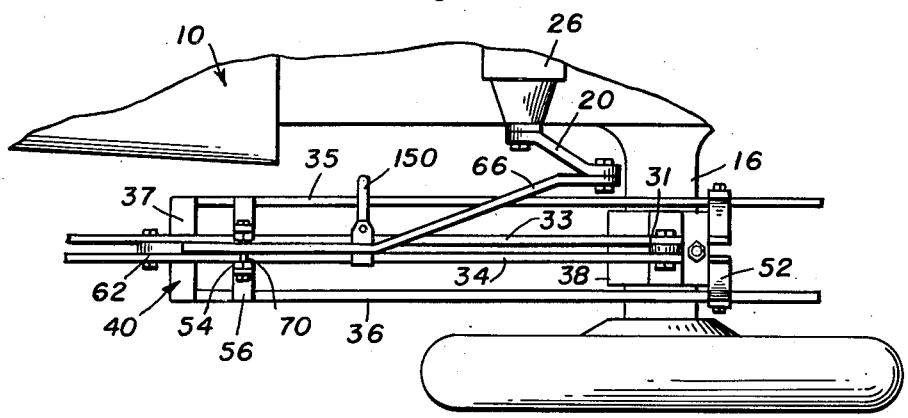
John M. Lee
INVENTOR.

Patented Oct. 20, 1953

2,655,853

UNITED STATES PATENT OFFICE 2,655,853

TRACTOR-MOUNTED CULTIVATOR

John M. Lee, Philadelphia, Miss.

Application August 8, 1949, Serial No. 109,164

4 Claims. (Cl. 97—46.07)

This invention relates to novel and useful improvements in farm implements.

The primary object of this invention is to cultivate on a hillside or on irregular terrain and allow one side of the cultivator to be lifted while the machine is in operation, without stopping the forward progress of the machine, for the purpose of avoiding the destruction of irrigation ditches which are commonly irregular in their travel.

Another object of this invention is to cultivate in successive stages that is, partially form a hill around the plants in a row by means of a first earth working tool in advance of the driver of the tractor or machine and then complete the operation by a second earth working tool in the rear of the operator of the tractor.

Another object of this invention is to simplify farming operations by an improved structure adaptable in connection with conventional farm equipment and particularly adaptable for use on commercial tractors, it requiring little or no modification of the tractor.

Ancillary objects and features will become apparent in following the description of the illustrated form of the invention.

In the drawings:

Figure 4 is a rear view of the device shown in Figure 1;

Figure 5 is a fragmentary plan view illustrative of a part of one earth working tool support and frame;

Figure 7 is a plan view similar to that of Figure 5 but showing the path of travel or movement of a latch for the means for raising and lowering the cultivator device.

Figure 1:
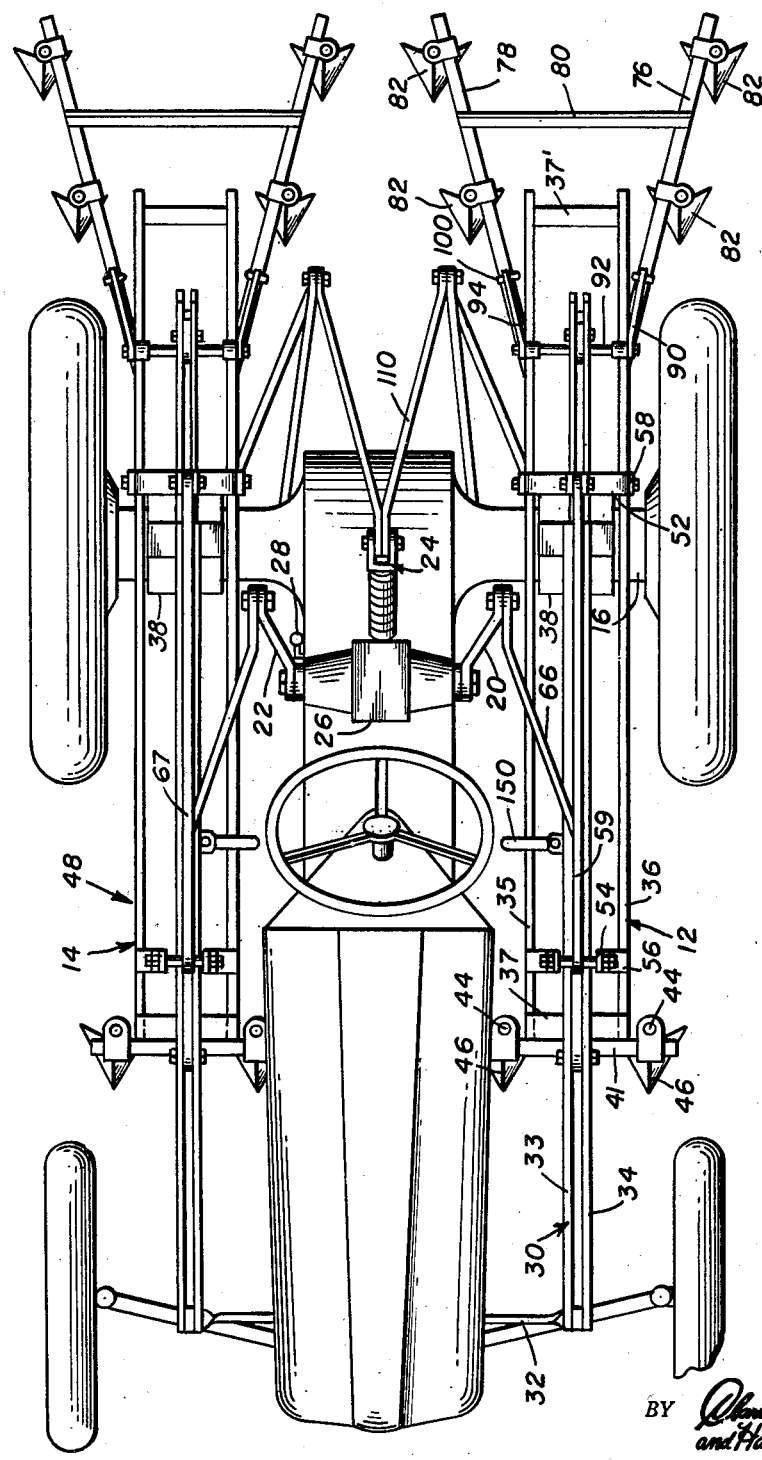
Figure 1 is a plan view of a tractor having an article of the invention secured thereto in operative condition.

In irregular countryside, rows of various crops are planted. In order to prevent erosion, irrigation ditches are dug in the irregular terrain. This is also an essential for proper irrigation of the crops.

Accordingly, since rows of plants or crops are planted parallel to each other and usually in rather straight lines, the irrigation ditches are winding with respect to the lines of the crops.

It is essential that the crops be cultivated. Hence, in using an ordinary implement for this purpose it is not uncommon that the cultivator destroys the irrigation ditches at the point where the irrigation ditches form a junction with the rows of crops.

The present invention deals with devices for preventing the destruction of the irrigation ditches. Two rows of the crops or crop are cultivated simultaneously. But, when either one or the other of the rows which is being cultivated reaches a junction with one of the irrigation ditches, the device for the cultivation pertinent to the junction is lifted by a simple maneuver without the necessity of stopping the tractor.

A conventional tractor generally indicated at 10 is illustrated. On each side of the tractor there is an identical crop cultivating device or assembly provided, one of which is indicated at 12, while the other is indicated generally at 14. Since each device is identical in character, structure and function, a description in detail of one of necessity leads to a complete understanding of the other.

The conventional structure provided on the tractor is substantially the same as that disclosed in Ferguson Patent No. 2,118,180, issued May 24, 1938, briefly, there is an axle housing 16 at the rear, a seat 18 disposed in the proper position, a pair of lift arms 20 and 22 respectively, a valve operating, spring loaded mechanism 24 disposed in the rear of the means 26 for hydraulically operating the lift arms 22 and 20. This means 26 is schematically illustrated in that it is absolutely conventional in nature. A shift or operating handle 28 is employed for the purpose of rendering the hydraulic means 26 operative for actuating the lift arms 20 and 22 respectively.

Figure 2:
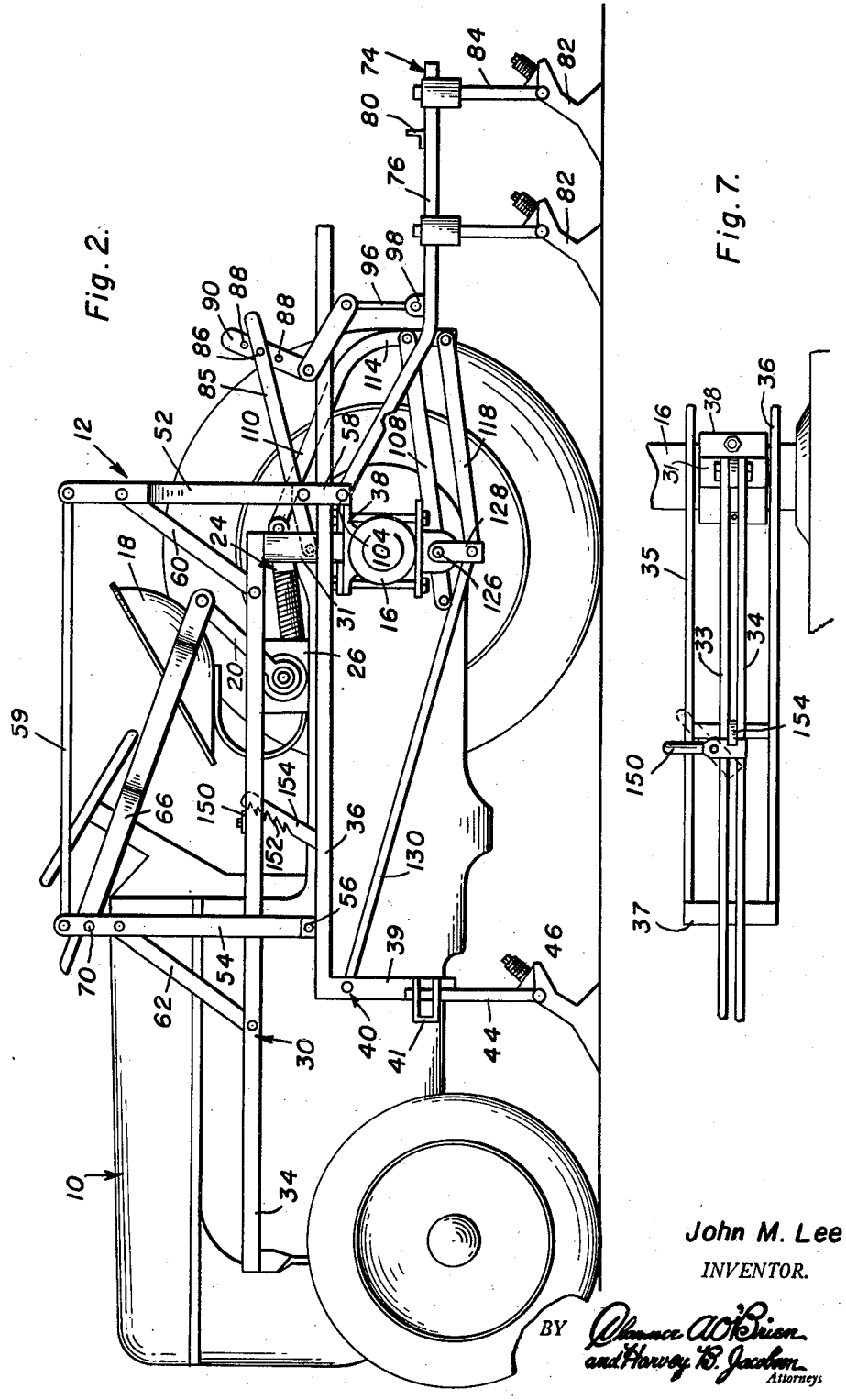
Figure 2 is an elevational view of the device shown in Figure 1.
Figure 3:
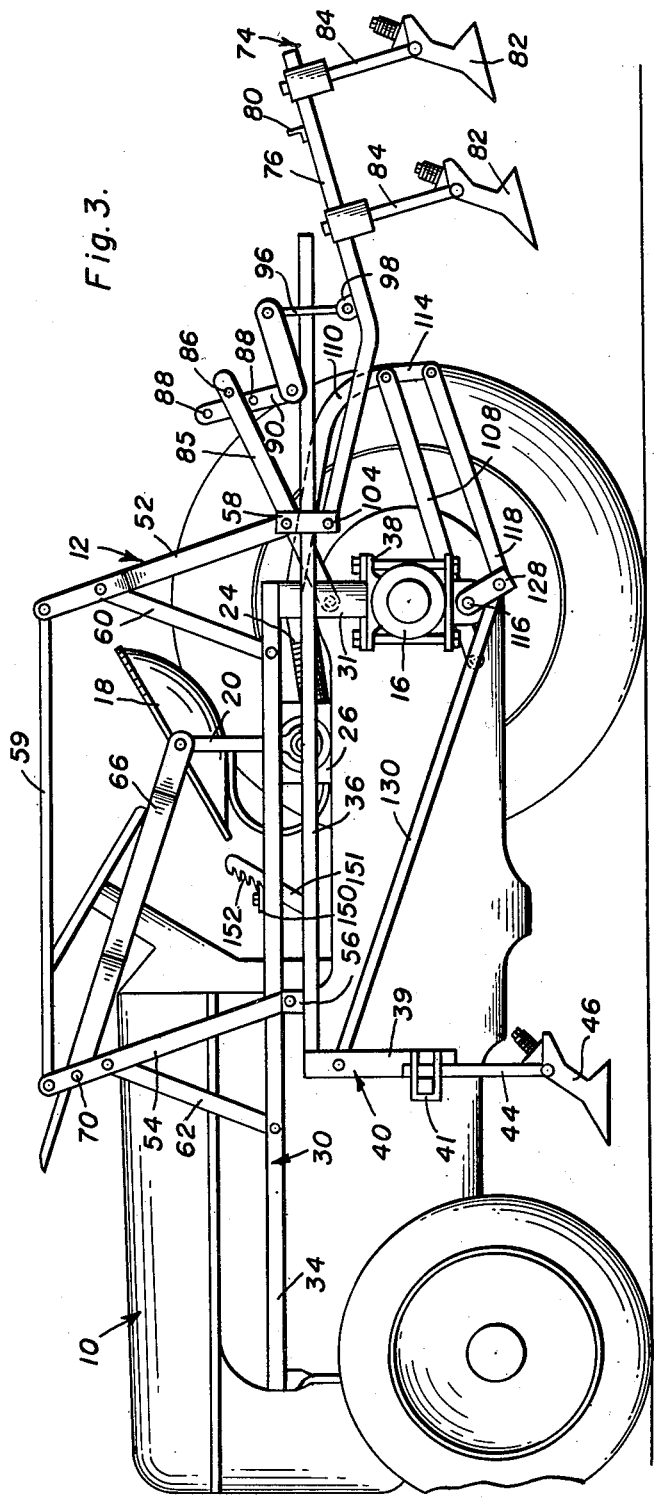
Figure 3 is an elevational view of the device shown in Figure 1, the said device being in a different condition of adjustment with respect to the illustration of Figure 2.
Figure 6:
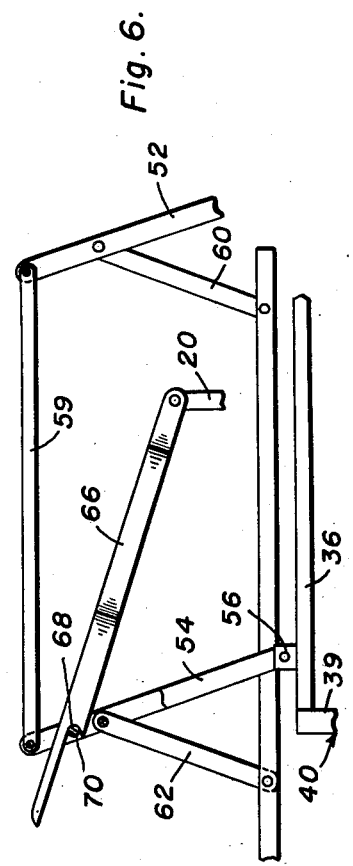
Figure 6 is a side view fragmentarily shown of the means for raising the cultivating device.

Correlating Figures 2 and 3 the general operation of the device is manifest. A support generally indicated at 30 is fixed to the front part of the tractor by means of the horizontal arm 32. This support (Figure 1) consists of a pair of spaced rods 33 and 34 which are horizontal and which have a depending bracket 31 at the rear thereof which stabilizes the operation of the device to cause it to run true. This bracket has a clamp 36 holding it in place on the axle housing 16. The support 30 is fixed stationary with respect to the tractor.

A frame generally indicated at 40 is disposed below the pair of arms 33 and 34 and consists of a pair of spaced structural members 35 and 36 held in spaced position by means of spacers 37 and 37'. Depending from the forward end of the bars 36 and 35 is a tool holder 39 having a cross member 41, from which depends the tool holding rods 44 which support the spring loaded earth working tool 46. These first earth working tools are disposed in advance of the seat 18 so that the operator of the tractor may note the progress of the tractor.

Means for raising and lowering the frame 40 together with its counterpart frame 48 for the movable parts of the devices 12 and 14 is provided. This means consists of pairs of links 52 and 54 which are pivoted at their lower ends to the brackets 56 and 58, fixed to the members 35 and 36. A pitman or link 59 connects the upper ends thereof. Accordingly, if any movement at all is possible, it will be in parallelogram fashion. Compression or push bars 60 and 62 respectively are pivoted at each end. One pair of ends are pivoted intermediate the ends of said pairs of links 52 and 54, while the other pairs of ends are pivoted on suitable pins (unnumbered) carried by the pair of members 33 and 34.

An operator for the pair of links of the assembly 12 is supplied. This operator consists of an arm 66 which is pivoted at one end to the lift arm 20 and which is operatively connected with the links 54. The lift arm 67 is provided for the assembly 14. This operative connection is formed by the notch 68 which is formed at a reduced end of the arm 66 releasably engaging the pin 70. The pin 70 is secured to the links 54 so that rotation in a counterclockwise direction of the lift arms 20 and 22 urges the links 54 of each assembly forward. This action puts the members 60 and 62 in compression and ultimately lifts the frame 40 whereby the earth working tools 82 and 46 are lifted. Since compression on the members 60 and 62 lifts the earth working tools both front and rear, which compression or force is applied through the arm 66, when it is desired to lift only one assembly 12 or 14, the arm 66 at 70 on the opposite side of the machine and handle 28, releasing hydraulic pressure causes arms 20 and 22 to lift. This action may be stated, as, in order that the frame 48 remain operative at a time when the frame 40 is released, the operator of the tractor need only raise the locking arm 67 appurtenant to the frame 48 which is identical to the locking arm 66 whereby this locking arm is operative but ineffectual.

At the same time that the frame 40 is being lifted, a second earth working tool generally indicated at 74 and disposed in the rear of the tractor is lifted to a higher elevation. This action gives greater clearance to the rear of the tractor where it is most needed in making turns. This second earth working tool has a framing consisting of a pair of converging members 76 and 78 held in spaced relation by means of a spacer 80. The inner ends of the converging arms 76 and 78 are pivoted to the bracket 58. Depending from the converging arms 76 and 78 are a number of cultivators, preferably shovel plows 82 carried by the hangers 84.

The specific means for raising and lowering the earth working tool 74 consists of the pull arm 85 which is pivoted to the depending bracket 31 at one end and which has a pin 86 at the other end. A pin 86 is selectively disposed in one of a number of apertures 88 which are formed in the crank 90 or simply disposed behind the portion of the crank having the apertures 88 therein, and by this connection the tool 74 is lifted in a floating position, this action being necessary to cultivate in rough or irregular terrain. As disclosed in Figure 3 the pin 86 is disposed behind this portion.

The crank 90 is pivoted on a pin 92 (Figure 1) and an identical crank 94 is pivoted at the opposite end thereof. A link 96 is pivoted at one end to the crank 90 and at the other end to a suitable ear 98 carried by the converging side member 76. An identical ear 100 is provided on the side member 78 in order to accommodate a link identical in both structure and function to the link 96.

Accordingly, as the frame 40 is being lifted, the crank 90 is operated either by the cam action of the pin 86 on one surface of a part of the crank or by pivotal action by having the pin 86 in one of the apertures 88, this action being accomplished by the pressure exerted by the pull arm 85 which is pivoted to the depending bracket 31. Upon actuation of the crank, the members 76 and 78 are rotated about their inner ends which are pivoted at 104 to the bracket 58.

Reference is now made to Figure 4 where the conventional tractor draw bars 106 and 108 are illustrated. A yoke 110 includes the legs 112 and 114. The upper end of the yoke is pivotally connected with the valve operator 24, while the legs are pivoted at a point spaced from their ends to the draw bars 106 and 108. The lower ends of the legs 112 and 114 are connected with a crank 116 through the medium of the pitman rods 118 and 120 as well as the arms 122 and 124. These arms are fixed rigid with the crank 116. Two additional arms 126 and 128 are secured to the crank 116, one being provided adjacent each end of the crank. The arm 128 has a pivotal connection with a pitman 130 which is also pivotally connected with the tool bar hanger 39. The arm 126 is pivotally connected with an arm identical in structure and function to the arm 130 but connected with the cultivator device 14.

When the frame 40 is in operative position, any movement of the frame due to variations in the draft force imposed upon the tools is transmitted through the arm 130 to the crank 116 causing pivotal movement of the yoke 120 about the ends of the draw bars 108 and 106 as a pivot point. This causes the valve 24 to be operated permitting proper functioning of the hydraulic system of the tractor.

To hold the frame in the proper position, without the application of hydraulic pressure, it is only necessary to pivotally actuate the keeper 150 which is pivoted to the pair of arms 33 and 34. This keeper engages in one of the number of teeth 152 and the latch 154, which is secured to the frame 40. After the frame 40 has been lifted, it may be retained in position through this structure.

The brackets 162 are carried by the clamp 38 for the purpose of mounting the crank 116 beneath the rear end of the tractor and in such position as to allow the yoke 110 to operate the hydraulic valve mechanism 24.

Having described the invention, what is claimed as new is:

1. In combination, a tractor having a pair of lift arms, together with a cultivator attachment, said attachment including a device for cultivating disposed on each side of the tractor, each of said devices comprising a support secured to said tractor, a vertically movable frame carried by said support with an earth working tool carried thereby, means operatively connecting said frame with one of said lift arms for raising said frame, means operatively connected with said support for releasably holding said frame in selected vertical position, a second earth working tool pivoted at the rear of the tractor to said frame, means secured at one end to said support and operatively connected to said second earth working tool to raise said second earth working tool when said frame is lifted comprising a pull arm pivoted at one end to said support, a crank pivoted intermediate its ends to said frame, means connecting said pull arm with said crank to pivot said crank, a tool bar pivoted to said frame and supporting said second earth working tool, and a link connecting said tool bar with said crank.

2. In a tractor having a pair of lift arms and a rear axle, a cultivator attachment comprising an elongated support disposed on each side of the tractor, said supports having forward ends secured to the forward end of the tractor and rear ends secured to the axle, a pair of tool-supporting side frames, forward and rear vertically swingable push bars pivotally attached to each support, forward and rear vertically swingable links pivoted to each frame, pitmans connecting said forward and rear links, said push bars being pivotally attached to said links, an operating arm pivotally attached to each lift arm and engaged with said forward links to selectively raise and lower said frames, rear tool-supporting frames disposed behind the tractor and pivoted to the rear ends of the side frames for vertical swinging movement into and out of working position, and means pivotally mounted on the side frames and connected to the rear frames and to the supports respectively to impart raising movement to the rear frames relative to the side frames during raising of the latter.

3. The combination of claim 2 wherein said tractor includes a hydraulic valve mechanism for the lift arms, and means operatively connecting said side frames to the valve mechanism for actuating the latter.

4. In a tractor having a pair of lift arms and a rear axle, a cultivator attachment comprising an elongated support disposed on each side of the tractor, said supports having forward ends secured to the forward end of the tractor and rear ends secured to the axle, a pair of tool-supporting side frames, forward and rear vertically swingable push bars pivotally attached to each support, forward and rear vertically swingable links pivoted to each frame, pitmans connecting said forward and rear links, said push bars being pivotally attached to said links, an operating arm pivotally attached to each lift arm and engaged with said forward links to selectively raise and lower said frames, rear tool-supporting frames disposed behind the tractor and pivoted to the rear ends of the side frames for vertical swinging movement into and out of working position, a vertically swingable member on the rear end of each side frame, said vertically swingable members having relatively perpendicular portions, pull arms terminally pivoted to each support and also pivoted to one portion of each vertically swingable member, and hanger links pivoted to the other portions of said members and intermediate portions of said rear frames, whereby raising of the side frames will cause raising of the rear frames relative to the side frames.

JOHN M. LEE.

References Cited in the file of this patent

UNITED STATES PATENTS

| Number | Name | Date |
|---|---|---|
| 1,671,507 | Boldt | May 29, 1928 |
| 1,906,430 | Strehlow | May 2, 1933 |
| 2,118,181 | Ferguson | May 24, 1938 |
| 2,321,464 | Cook | June 8, 1943 |
| 2,324,840 | Hipple | July 20, 1943 |
| 2,359,206 | Currie | Sept. 26, 1944 |
| 2,425,806 | Ing | Aug. 19, 1947 |